Aug. 26, 1952     G. WALLMANNSBERGER     2,608,161
PASSENGER CABLE RAILWAY FOR ENDLESS-ROPE OPERATION
Filed Nov. 28, 1947     3 Sheets-Sheet 1
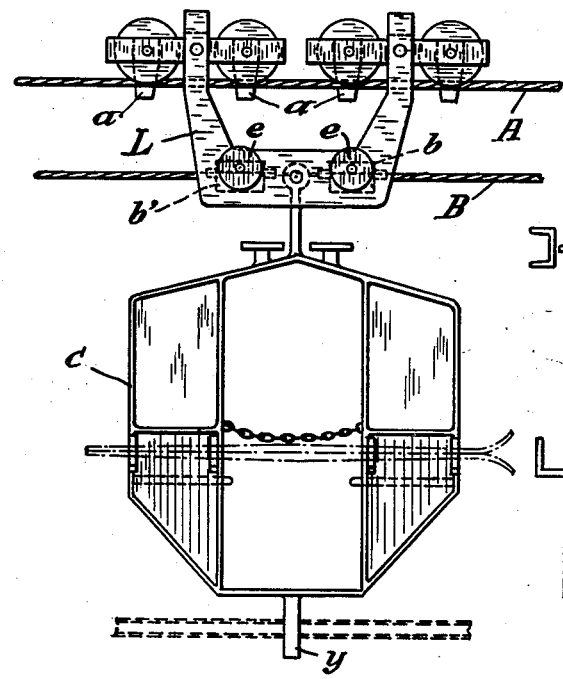
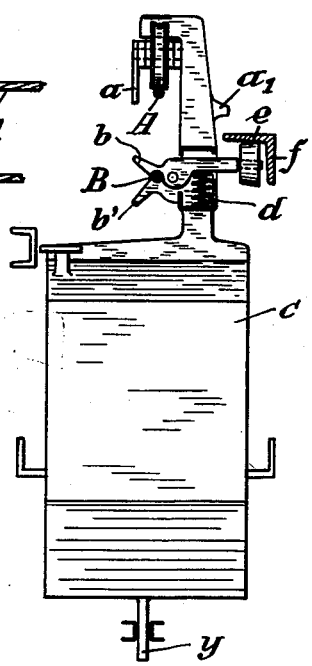
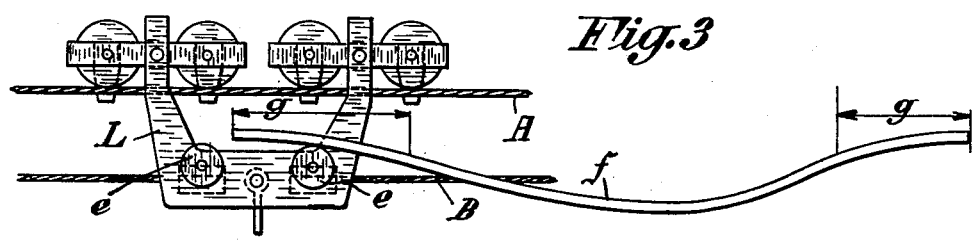
Inventor
G. Wallmannsberger Aug. 26, 1952　　G. WALLMANNSBERGER　　2,608,161
PASSENGER CABLE RAILWAY FOR ENDLESS-ROPE OPERATION
Filed Nov. 28, 1947　　3 Sheets-Sheet 2
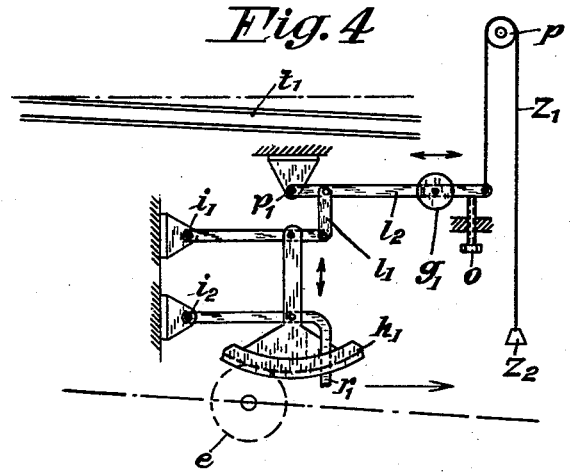
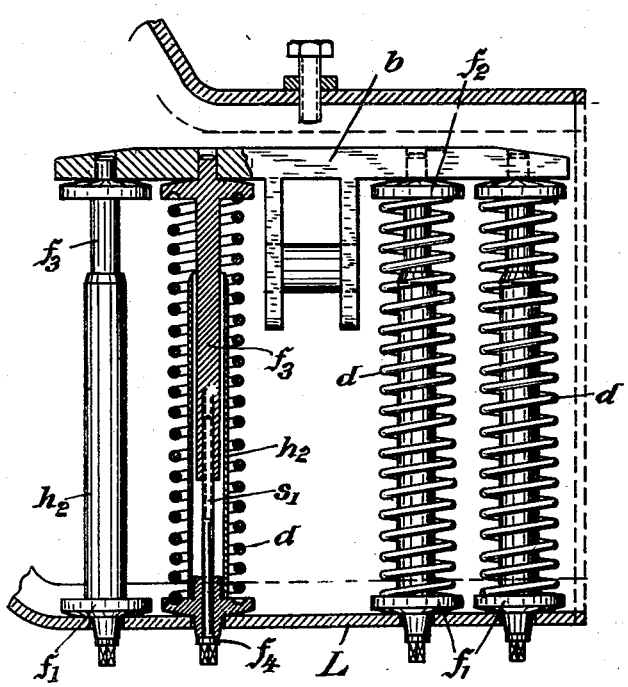
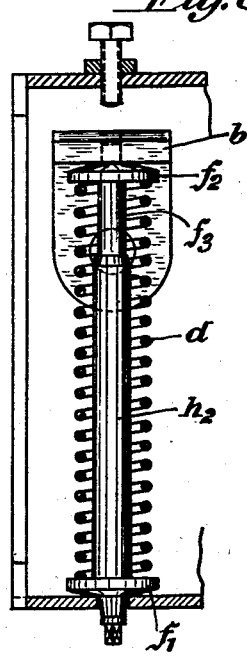
Inventor
G. Wallmannsberger Aug. 26, 1952 G. WALLMANNSBERGER 2,608,161
PASSENGER CABLE RAILWAY FOR ENDLESS-ROPE OPERATION
Filed Nov. 28, 1947 3 Sheets-Sheet 3
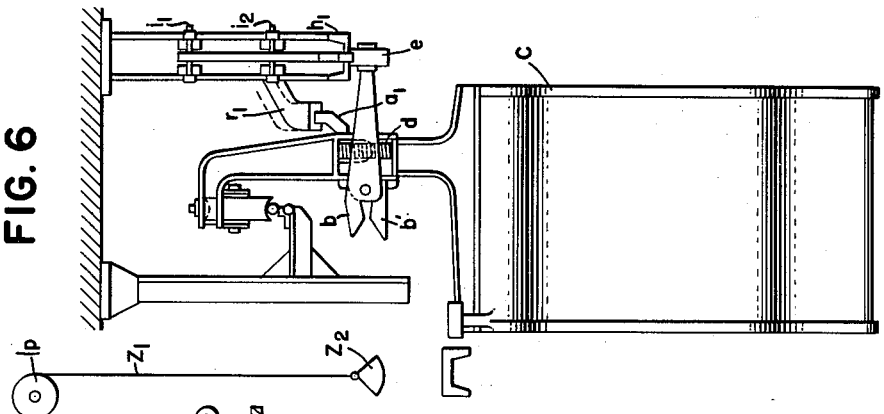
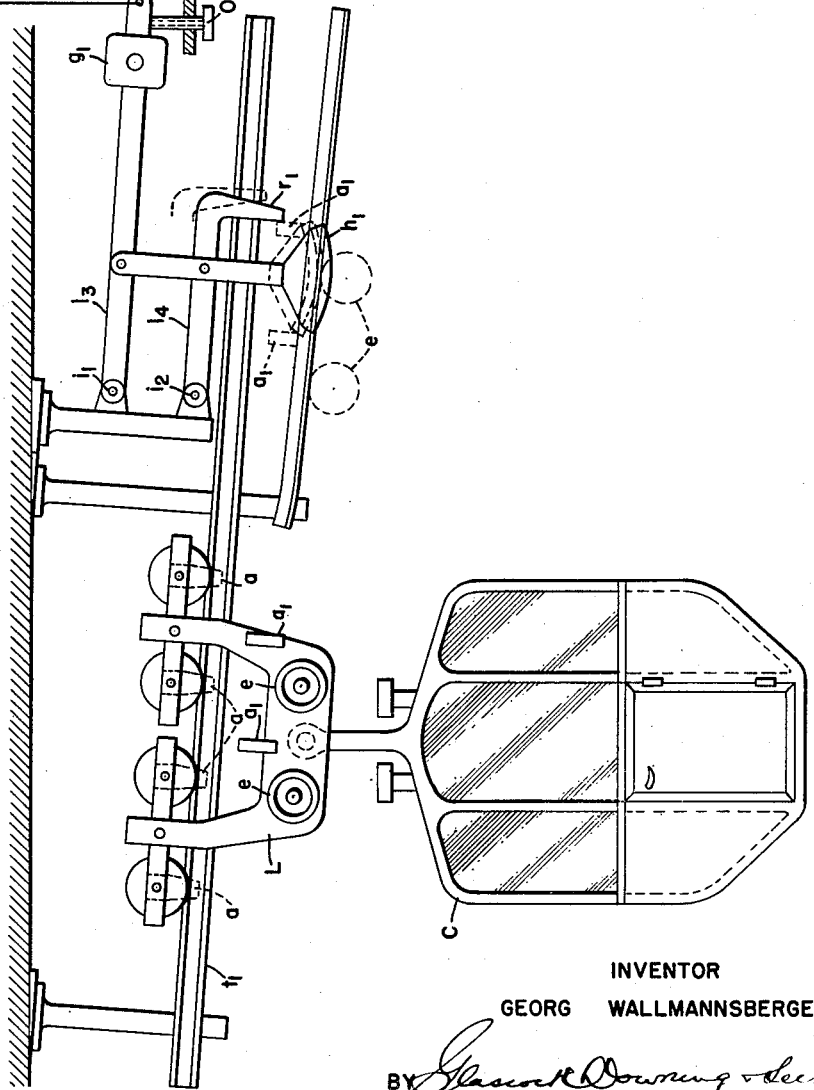
INVENTOR
GEORG WALLMANNSBERGER
ATTORNEYS Patented Aug. 26, 1952

2,608,161

UNITED STATES PATENT OFFICE 2,608,161

PASSENGER CABLE RAILWAY FOR ENDLESS-ROPE OPERATION

Georg Wallmannsberger, Salzburg, Austria

Application November 28, 1947, Serial No. 788,750
In Austria November 29, 1946

5 Claims. (Cl. 104—209)

The invention relates to a passenger cable railway for endless-rope operation.

The essential advantage of the endless-rope operation of passenger cable railways is to be found in the much smaller cross section of the carrying cable resulting in lower costs of construction in spite of increased conveying capacity.

All automatic rope clamping devices, however, which have so far been known from the construction of cableways for the conveyance of materials are far too unreliable in operation as to permit their adoption for passenger cable railways.

Taking account of that fact, the present invention creates a new type of construction with safeties perforce achieved in the weak points.

The aim of the operation is the creation of an endless-rope type passenger cable railway, which affords the safety required for that type of operation. The first aim is the provision of the necessary safety of the coupling of the passenger cablecars with the traction rope. For this purpose, the essential feature of the invention is the provision of tonglike clamping jaws, which are subject to spring action and couple the running gear, which runs on the carrying rope and carries the passenger cablecar, with the endless traction rope. Said clamping jaws open sideways, the lower jaw being rigidly, the upper one movably arranged.

Accordingly, the present invention has for an object to provide in a passenger cable railway system of the type embodying a towing cable and towing cable gripping means on the cable car a safety device operable to check the gripping pressure of the gripping means.

It is a further object to provide such a safety device in which the car will be stopped if the gripping pressure is inadequate.

In connection with this safety device it is a further object to provide a compact overhead running gear structure which embodies the towing cable gripping means and further incorporates a battery of springs for applying the gripping pressure and abutment means forming part of the safety device operable to cooperate therewith to check the forward movement of the car.

Further and more specific objects will be apparent from the accompanying drawings, in which Figure 1 illustrates the cable car and the overhead carrier in side elevation, Figure 2 is an end elevation partly in section of the arrangement shown in Figure 1, Figure 3 illustrates the clutch rail for uncoupling the gripping means from the towing or traction cable, Figure 4 illustrates the safety device embodied in the station of the railway system, Figure 5 illustrates in side elevation the cooperation of the car with the safety device, Figure 6 is an end elevation looking to the left of the arrangement shown in Figure 5, Figure 7 is a side view partly in section of the pressure applying means embodied with each pair of gripping jaws on the running gear frame, and Figure 8 is an end elevation partly in section of the arrangement shown in Figure 7.

Fig. 1 shows a regular four-roller running gear L with antifall safety devices $a$. The gear differs from regular running gears of cable railways for the conveyance of materials in that for the one traction rope for towing cable B not one but two clamping or gripping means $b$, $b'$ are provided.

Fig. 2 shows that these two rope clamps $b$ do not open as usual overhead and underneath but sideways, the passenger cablecar hanging between the two clamping means.

Each rope clamp is clamped fast by several pressure springs $d$. The opening and closing of the clamps is effected by a conventional clutch rail not shown, which actuates a roller-type lever. For coupling in, the car is shoved through the coupling points by hand. This operation is facilitated by a convenient inclination of the carrying rail.

Fig. 3 shows the form of a clutch rail $f$ serving to uncouple the running gear from the traction rope B. At the approach and departure ends the rail is provided with transition curves $g$ making for shockless engagement.

Disregarding the safety devices described in the following, the regular operation would be the same as that of a regular endless-rope type cable railway, with the difference, however, that the rope enters the clamps sideways and that instead of one rope clamp there are two of them, each of which is able to hold the car with sufficient safety at even the steepest slope of the track.

In the stations or at their coupling points, as well as in summit supports, it is sometimes necessary that the cablecar proceeds in absolutely perpendicular position, especially if under uneven load, in order to prevent accidents that might be caused by lateral inclination. According to the invention the bottom of the cablecar is provided with a spur $y$, which slides between two guides which are installed in the stations.

The further development of the invention aims at the provision of an automatic check of the pressure of the clamping means for the traction rope during the shoving by hand of the cablecar through the stations. The automatic check likewise functions to automatically block the passage of a cable car in which the clamping pressure or force applicable to the towing cable clamping means is inadequate.

In Fig. 4 is illustrated an arrangement of the automatic checking device which is to be installed in each station. A curved pressure beam $h_1$ is hinged by means of a parallelogram guide in the fixed points $i_1$ and $i_2$ so as to permit the vertical motion of the beam. The parallelogram guide is connected by the link $l_1$ with the weight lever $l_2$, which turns about the fulcrum $p_1$ and carries an adjustable weight $g_1$. An adjusting screw $o$ secures the compound lever arrangement in its position of rest whereas a rope pull $z_1$—$z_2$ is attached at the end of the weight lever.

In this Fig. 4 there is disclosed in dotted lines and in addition to the vertically movable pressure beam $h_1$, the control roller $e$, which is attached to the lever arm of the movable clamping jaw $b$, shown in Fig. 2. Beside the pressure beam $h_1$ a locking bar $r_1$ is provided, which in certain cases as engaged by a stop $a_1$, Fig. 2, which is attached to the frame $a$. In the stations the cablecar runs along the moderately inclined suspension rail $t_1$, which here takes the place of the carrying rope A.

As indicated in Fig. 5 car C supported by the wheels aligned with the top of the running gear frame rolls along the rail with the stops or abutments $a_1$ projecting laterally of the sides of the running gear frame opposite to the clamping jaws $b'$ of each pair. As shown, two pairs of clamping jaws are embodied, the movable jaw $b$ having a laterally extending lever arm carrying the roller $e$. The abutments are axially spaced in advance of the respective clamping jaw arrangements. The checking device is suitably supported in the station and must be passed by the car in its passage along the rail. In Fig. 5 the movable pressure beam $h_1$ is pivotally connected to the parallelogram linkage including the arms $l_3$ and $l_3$ respectively pivoted at $i_1$ and $i_2$, the adjustable weight $g_1$ functioning similar to the manner of the arrangement of Fig. 4 and supported on the lever $l_3$. The locking bar or suitable member $r_1$ moves vertically with the pressure beam $h_1$ and in its lowermost position is in the path of movement of the projections $a_1$ extending from the running gear frame of the carrier or car.

In the operation of this checking device or apparatus as illustrated it is necessary that the car C pass the check point before leaving the station. The car is pushed forward along the rail $t_1$ so that the roller $e$ carried by the arm of the movable clamping jaw $b$ meets the curved bottom of the vertically movable pressure beam $h_1$. The calculated gripping pressure necessary to satisfy safety requirements and insure an adequate grip of the towing cable by the jaws of the gripping means has been precalculated and the spring batteries, including the plural springs $d$, described more in detail hereinafter have been set and adjusted so that they exert an upward pressure on the movable jaw to meet the safety requirements. Thus, this roller $e$ exerts this upward pressure. The pressure beam $h_1$ can be adjusted for this safety pressure by manipulation of the weight $g_1$ along the lever $l_2$ in Fig. 4 and $l_3$ in Fig. 5. When the car has reached the check point, the clamping springs are somewhat relieved since there is no cable being gripped and the weight exerted by the pressure beam $h_1$ presses the roller $e$ downwardly until the clamping springs have reached the tension which is the normal operating tension when the jaws are gripping a towing cable. Thus, if the spring pressure is adequate the car will proceed and the pressure beam $h_1$ will not reach its lowermost position as shown in full lines in Fig. 5. This is due to the fact that the roller $e$ if spring pressure factors are adequate is exerting an upward pressure in excess of the downward pressure exerted by the beam $h_1$. Thus, the spring pressure acting to lift the roller $e$ will cause the roller to lift the pressure beam which in its upward movement carries the stop bar $r_1$ so that the stops or abutments $a_1$ on the car running gear pass beneath the bar $r_1$. However, if the force exerted by the spring batteries is for any reason insufficient, as for example if one or more of the springs are broken, the upward pressure exerted by the roller $e$ is less than the downward pressure exerted by the beam $h_1$ and in moving the car the roller is unable to elevate the pressure beam $h_1$ so that the stop member $r_1$ remains in the path of movement of the abutments $a_1$ and accordingly is engaged by the same and automatically arrests the passage of the car. The car cannot proceed further until the rope pull has been actuated to manually lift the stop member $r_1$ out of the path of movement of the abutments on the car running gear frame.

The assembly and disassembly of the strong helical pressure springs $d$ required for clamping the traction robe B involves considerable difficulties.

In further developing the design of the cablecar, therefore, the invention provides a sleeve with a female thread, said sleeve extending from the one spring head into the interior of the spring whereas a threaded bolt may be screwed into the female thread through an axial bore provided in the other spring head. By that screwing device the spring may be compressed as required for assembly or disassembly, the screwing device taking up the tension of the spring.

An embodiment of a spring battery for one of the pairs of gripping jaws is illustrated in Figs. 7 and 8.

In the frame L the pressure springs, which have the form of helical springs $d$, are supported with their bottom spring heads $f_1$ in the bottom flange $a_2$ of the frame while they press with their top spring heads $f_2$ against the lever which at one end forms the upper movable clamping jaw $b$. The lower clamping jaw $b'$ is firmly attached to the frame L. The upper spring head $f_2$ is prolonged to form a bolt $f_3$, which is provided with an axial threaded bore. The lower spring head $f_1$, on which has been set a sleeve $h_1$ for the spring, is in its center provided with a bore, through which a central threaded bolt $s_1$ is introduced, which is supported by means of the flange $f_4$ in the spring head and with its thread engages the threaded bore of the bolt $f_3$ thus straining the spring, which in that condition may be assembled or disassembled.

It is therefore clear that I have provided for a passenger cable railway of the type including supporting means for a car and a towing cable to propel the car therealong that is disposed beneath, spaced from, and in substantially the same vertical plane as the supporting means. The car is provided with an overhead running gear which includes a frame having top and bottom portions and a base structure. Wheels are carried by the frame adjacent the top portion and roll along the supporting means and as indicated in the drawings the body portion of the frame is disposed to one side of the supporting means, extends parallel therewith, and has a vertical extent greater than the distance between the supporting means and the towing cable. The towing cable gripping means are provided on the running gear frame as shown and include two pairs of jaws spaced from one another in an axial direction to the cable and each pair includes fixed jaws extending laterally of the frame in a direction toward and perpendicular to the supporting means and carried by the body portion of the frame at areas spaced from the top portion a distance such as to dispose the fixed jaws beneath the towing cable. The movable jaws of each pair are mounted on the frame and extend laterally thereof in the same direction as and above each of the fixed jaws for cooperation therewith in gripping the towing cable. Spring pressure applying means supported on the running gear frame include a battery of springs for each pair of jaws, the springs of each battery extending perpendicular with respect to the axis of the towing cable and means extending between the fixed and movable jaws and embodied with the spring to provide for assembly and disassembly thereof and likewise varying the compressive force of the springs. To cooperate with the aforedescribed towing cable gripping means and in order to check whether the clamping or gripping force is adequate there is provided a vertically movable pressure applying means which applies pressure in opposition to the action of the springs and this pressure applying means includes the beam $h_1$ which is disposed in the path of movement of the car and specifically in the path of movement of a roller carried by a lever arm of the movable jaw of each pair of jaws. A stop member is connected to and movable with the pressure beam and an abutment is embodied with the frame of the running gear and is so disposed thereon that when the car moves this abutment moves in a path that intercepts the path of movement of the stop member so that the car in passing through the station is stopped when the rollers on the movable jaws engage the pressure beam if the spring pressure is not sufficient to lift the pressure beam and the stop member out of the path of movement of the abutments on the frame.

I claim:

1. A cable railway system of the type embodying a towing cable and including supporting means for an overhead carrier, an overhead carrier movable along said means, a fixed jaw on said carrier, a movable jaw on said carrier, spring pressure applying means normally tending to cause the movable jaw to move in a direction to grip the towing cable, a projection on said carrier, a stop member disposed in the path of movement of the projection moving with said carrier, and means engageable by the movable jaw for displacing the stop member out of the path of the projection, said displacing means including a vertically movable pressure beam engageable with the movable jaw with a pressure such that if the compressive force of said spring means falls below a predetermined value, said displacing means is not operated and said stop member is maintained in position to arrest movement of said projection and thereby stop said carrier.

2. In a cable railway combination of the type embodying a pulling cable, a supporting cable, an overhead carrier movable along said cable, a pair of jaws on said carrier for gripping the pulling cable, one of said jaws being fixed and the other being movable, spring pressure applying means normally tending to cause said movable jaw to move toward said fixed jaw, an arm arranged on said movable jaw, a projection on said carrier, a compound lever arrangement, a stop member on said compound lever arrangement and disposed in the path of the projection moving with said carrier, a weight movably arranged on said compound lever arrangement, and a displaceable pressure beam arranged on said compound lever arrangement in the path of said arm on said movable jaw and engageable therewith to check the gripping pressure of said spring means whereby if said pressure is below a predetermined value said stop member remains in the path of movement of said projection and stops said carrier, and if the said pressure is sufficient said arm moves said pressure beam and thereby said stop member out of the path of movement of said projection and thus the carrier proceeds.

3. A passenger cable railway of the type embodying a towing cable and including a car, overhead running gear carried by said car, supporting means for the running gear, said running gear including a frame disposed to one side of said towing cable and parallel therewith, spaced gripping means carried by said frame for gripping the towing cable at axially spaced points, each including a fixed jaw extending laterally of said frame in a direction perpendicular to said towing cable and disposed beneath the same, and a movable jaw pivotally mounted within said frame and extending outwardly therefrom parallel with said fixed jaw but above the same and cooperable with said fixed jaw so that the jaws grip said towing cable from a direction above and below the same, and spring means disposed between said fixed and movable jaws including a battery of coil springs adapted to exert pressure on said movable jaw to normally cause the same to move toward gripping relation with said fixed jaw, said movable jaw including an arm extending outwardly from said frame on the side opposite said fixed jaw, an abutment carried by said frame, and means checking the gripping pressure exerted by said springs comprising a movable stop member disposed in the path of movement of said abutment, a vertically movable pressure beam disposed in the path of movement of said arm, means connecting the stop member and the pressure beam for movement together so that when the car is proceeding the pressure beam is engageable with the arm to check the compressive force of said springs whereby if said force is below a predetermined value said stop member remains in the path of movement of said projection and stops said carrier and if the force is at or above said predetermined value said arm exterts vertical lifting force on said pressure beam and moves the same and thereby the stop member out of the path of movement of said projection to permit said car to pass.

4. An overhead passenger railway system of the type embodying a towing cable and including a supporting means, a car, an overhead running gear carried thereby, said running gear being supported on said supporting means and movable therealong, said running gear further including a frame having towing cable gripping means spaced from one another in the axial direction of the cable and each of said gripping means including a fixed jaw projecting laterally from said frame a distance beneath said supporting means as to dispose said jaw beneath the towing cable, a movable jaw projecting laterally from said frame and cooperable with said fixed jaw to grip the towing cable therebetween, gripping pressure applying means for said jaws including a plurality of springs each extending perpendicular with respect to the axis of the towing cable, means connected between said fixed and movable jaws to vary the compressive force of said springs, a vertically movable pressure applying means applying pressure in opposition to the action of said springs and disposed in the path of movement of said car to check the compressive force of said springs when the car proceeds, a stop member connected to and movable with said pressure applying means, and an abutment carried by said frame and disposed in the path of movement of said stop member whereby if the compressive force of said springs is below a predetermined value said stop member engages said projection and stops said car and if said force is at or above said predetermined value said stop member is ineffective to stop said car.

5. A passenger cable railway of the type including supporting means for a car, and a towing cable to propel the car therealong disposed beneath, spaced from and in substantially the same vertical plane as the supporting means, comprising a car, overhead running gear supporting the car including a frame having top and body portions and a base, wheels carried thereby adjacent the top portion and adapted to roll along said supporting means, the body portion of said frame being disposed to one side of said supporting means, extending parallel therewith and having a vertical extent greater than the distance between the supporting means and the towing cable, towing cable gripping means including fixed jaws extending laterally of said frame in a direction toward and perpendicular to said supporting means and carried by said body portion of said frame at areas spaced from the top portion a distance to dispose the fixed jaws beneath the towing cable, said jaws being spaced from one another in the axial direction of the supporting means and the towing cable, movable jaws mounted on said frame and each extending laterally thereof in the same direction as and above each of said fixed jaws for cooperation therewith in gripping said towing cable, spring pressure applying means supported on said frame and engageable with said movable jaws to normally apply gripping pressure thereto comprising a battery of coil springs for each pair of jaws, each coil spring being disposed perpendicular to said fixed jaw and beneath said movable jaw axially adjustable means disposed within each spring and extending between the movable jaw of each pair of jaws and the base of said frame for varying the compressive force of said springs, an arm connected to each movable jaw and extending laterally of said frame from the side opposite said fixed jaws, spaced abutments extending laterally from said frame on the same side as and axially forwardly of each arm, a roller carried by the free end of each arm, and means in the path of movement of said car for checking the gripping pressure exerted by said jaws including a movable pressure beam normally disposed in the path of movement of said rollers, means supporting said beam for movement out of said path, a movable stop member normally in the path of movement of said abutments and normally effective to engage one of said abutments to prevent the passage of said car, means exerting pressure on said beam in a direction opposed to the pressure exerted by said spring batteries, means connecting said stop member for movement with said pressure beam so that upon movement of said car said arm engages said pressure beam to check the gripping pressure exerted by said spring batteries whereby if said pressure is below a predetermined force, said stop member remains in the path of movement of said abutments and engages one of the same to stop the car and if the pressure exerted by said spring batteries exceeds the pressure applied to said beam, said beam is moved and said stop member is thereby moved out of the path of movement of said projection to permit said car to pass.

GEORG WALLMANNSBERGER.

REFERENCES CITED

The following references are of record in the file of this patent:

UNITED STATES PATENTS

| Number | Name | Date |
|---|---|---|
| 913,775 | Seymour | Mar. 2, 1909 |
| 1,109,371 | Thunhart | Sept. 1, 1914 |
| 1,860,241 | Galko | May 24, 1932 |
| 2,026,860 | Bender | Jan. 7, 1936 |
| 2,084,879 | Weise | June 22, 1937 |
| 2,117,128 | Young | May 10, 1938 |

FOREIGN PATENTS

| Number | Country | Date |
|---|---|---|
| 21,364 | Austria | Apr. 15, 1905 |
| 117,700 | Austria | Feb. 15, 1929 |
| 183,488 | France | May 11, 1887 |
| 445,599 | France | Nov. 14, 1912 |
| 32,876 | Germany | Mar. 20, 1885 |
| 91,427 | Germany | Apr. 21, 1896 |